US005553271A

United States Patent [19]

Hile et al.

[11] Patent Number: 5,553,271
[45] Date of Patent: Sep. 3, 1996

[54] AUTO-DETECT SYSTEM AND METHOD FOR DATA COMMUNICATION

[75] Inventors: John K. Hile, Monroe; Michael R. Ward, Ann Arbor, both of Mich.

[73] Assignee: Hilgraeve Incorporated, Monroe, Mich.

[21] Appl. No.: 273,481

[22] Filed: Jul. 11, 1994

[51] Int. Cl.⁶ .................................................. G06F 9/455
[52] U.S. Cl. .................................................. 395/500
[58] Field of Search .................. 340/172.5; 364/200; 370/94; 235/435; 379/67; 395/500

[56] References Cited

U.S. PATENT DOCUMENTS

| | | | |
|---|---|---|---|
| 3,863,226 | 1/1975 | Ryburn | 340/172.5 |
| 3,891,974 | 6/1975 | Coulter et al. | 340/172.5 |
| 4,077,058 | 2/1978 | Appell et al. | 364/200 |
| 4,316,283 | 2/1982 | Ulug | 370/94 |
| 4,425,664 | 1/1984 | Sherman et al. | 375/8 |
| 4,604,686 | 8/1986 | Reiter et al. | 364/200 |
| 4,635,275 | 1/1987 | Borg et al. | 375/8 |
| 4,680,781 | 7/1987 | Amundson et al. | 375/8 |
| 4,715,044 | 12/1987 | Gartner | 375/8 |
| 5,012,489 | 4/1991 | Burton et al. | 375/8 |
| 5,021,949 | 6/1991 | Morten et al. | 364/200 |
| 5,031,207 | 7/1991 | Hesdahl et al. | 379/93 |
| 5,034,598 | 7/1991 | Poland | 235/435 |
| 5,097,528 | 3/1992 | Gursahaney et al. | 379/67 |
| 5,222,081 | 6/1993 | Lewis et al. | 375/117 |
| 5,274,679 | 12/1993 | Abe et al. | 375/117 |

OTHER PUBLICATIONS

HyperAccess, Communications Software For Windows, User's Manual Hilgraeve, Inc. 1993, written and produced by Mahler Associates, Inc., Ann Arbor, Michigan.

*Primary Examiner*—Kevin J. Teska
*Assistant Examiner*—Russell W. Frejd
*Attorney, Agent, or Firm*—Harness, Dickey & Pierce

[57] ABSTRACT

A method and system which is adapted to receive a data stream, and test a series of multiple-bit sequences from this data stream against a plurality of different character forming criteria until both of the following events have occurred. Specifically, a predetermined number of the multiple-bit sequences must be received and tested, and a predetermined mix of multiple-bit sequences satisfying at least two of the character forming criteria must be received and tested. Once both of these events have occurred, then a data word format is determined from the results of this testing, and the computer is configured to interpret and output characters from the data stream in accordance with this data word format setting. The characters interpreted from the data stream are also tested against a plurality of terminal emulation criteria until a character sequence has been detected which is indicative of only one emulation standard.

11 Claims, 7 Drawing Sheets

AUTO-DETECT SYSTEM AND METHOD FOR DATA COMMUNICATION

BACKGROUND OF THE INVENTION

The present invention generally relates to data communication, and particularly to a system and method for automatically detecting and responding to the transmission settings used by a data communication transmitter. More specifically, the present invention is designed to automatically configure both the word format interpreter, as well as automatically select the type of terminal needed to be emulated at the data communication receiver.

Anyone who has ever spent much time with a computer knows that installing just about anything new can be both a frustrating and time consuming experience. Even when all of the hardware and software is properly installed, the addition of a new capability can present yet another challenge to the user. For example, something as simple as calling a new telephone number with a computer is not as easy as it sounds. With normal voice telephone communication, only a telephone number is needed to initiate a telephone call, and absolutely nothing is needed to answer an incoming call. However, this is not the case with computer-to-computer telecommunication or other forms of serial communication between computers. In order for two computers to communicate effectively, each of them must be able to understand the codes that the other is transmitting, whether these codes represent text, control or screen characters. Even a person's ability to understand a spoken word, such as "Hello", depends upon a knowledge of the English language. In other words, the mere act of providing a computer with the telephone number of another computer will not guarantee that either computer will be able to understand even a single character of text from the other. Rather, various disparate communication settings must be properly configured in order for two computers to communicate through a modem or other data stream interface.

Unfortunately, the configuration of a computer's communication settings is possibly one of the least understood aspects of using a computer. For example, while most people have a general understanding that "baud rate" is somehow a measure of communication speed, relatively few people fully appreciate what this measurement means or realize that the effective baud rate can be considerably different than the rating of the modem itself. Additionally, the user is usually confronted with determining several interrelated settings for interpreting a computer "word" which are less than intuitive, such as parity, the number of data bits and the number of stop bits. For example, the parity setting could be configured with one of the following choices: none, even, odd, mark or space. In contrast, the number of data bits could alternatively be configured with numbers such as 8, 7, 6, or 5, depending upon the choice made for the parity setting. Likewise, the number of stop bits could alteratively be configured with numbers such as 1, 1.5 or 2, depending upon the choices already made for the other two settings.

Furthermore, computers generally communicate with each other as though they were a specific type of standard "terminal" that would be connected to a particular host computer, even though only the smallest of micro-computers are involved in the communication. Generally speaking, a computer terminal includes at a minimum a keyboard for entering information from the host computer, and a display, such as a CRT (cathode ray tube), for viewing information from the host computer. The technique of simulating the operation of a computer terminal is called terminal emulation, and it is needed in order to convey non-text character codes between computers. For example, screen codes are needed in order to properly display text and graphics, such as wrapping text onto the next line of the monitor or screen when the line of text would otherwise extend beyond the fight edge of the screen. Control codes are also used to execute a command, such as "break" to interrupt communication between the computers. There are various types of terminal standards currently in use, such as ANSI, VT100, TTY and IBM3278, and each of these terminals have their own complete set of key code meanings and display sequences.

Unless all of this information has already been programmed into a computer, it will be up to the computer user to intelligently enter this information into his/her computer for each telephone number or computer system that the user needs or desires to conduct a communication session. In light of the fact that there is a multitude of commercial, vendor support and private bulletin board services available to a computer user today, the user may have to repeat the process of configuring the communication settings quite a number of times without really having a reasonable understanding of the underlying process. In other words, one of the more important aspects of computer operation today, that is the ability to communicate with other computers, still remains a repetitive and relatively obscure procedure.

Accordingly, it is a principal objective of the present invention to provide a method and system for automatically detecting the data communication settings being used by another computer, and automatically configuring the data communication settings to this computer, without necessarily having any advance knowledge of the computer other than a telephone number or interface address.

It is another objective of the present invention to provide an auto-detect method and system which is capable of detecting both the transmission word format and the terminal standard being employed without requiring any user intervention or pre-arranged communication protocol or handshaking procedure.

It is a further objective of the present invention to provide an auto-detect method and system which is independent of the data being transmitted or the specific modem sets or interfaces being employed.

It is an additional objective of the present invention to provide an auto-detect method and system which is capable of turning itself off, as well as checking for line noise and reinitialization requests.

SUMMARY OF THE INVENTION

To achieve the foregoing objectives, the present invention provides a method and system which is adapted to receive a data stream, and test a series of multiple-bit sequences from this data stream against a plurality of different character forming criteria until both of the following events have occurred. Specifically, a predetermined number of the multiple-bit sequences must be received and tested, and a predetermined mix of multiple-bit sequences satisfying at least two of the character forming criteria must be received and tested. Once both of these events have occurred, then a data word format is determined from the results of this testing, and the computer is configured to interpret characters from the data stream in accordance with this data word format setting.

The present invention is also adapted to test the characters interpreted from the data stream against a plurality of terminal emulation criteria until a character sequence has been detected which is indicative of only one terminal emulation standard. In this regard, a multiple-level state machine is advantageously employed to facilitate a rapid and reliable determination of the emulation mode that should be employed for the current communication session.

Additional features and advantages of the present invention will become more fully apparent from a reading of the detailed description of the preferred embodiment and the accompanying drawings in which:

DETAILED DESCRIPTION OF THE PREFERRED EMBODIMENTS

Figure 1:
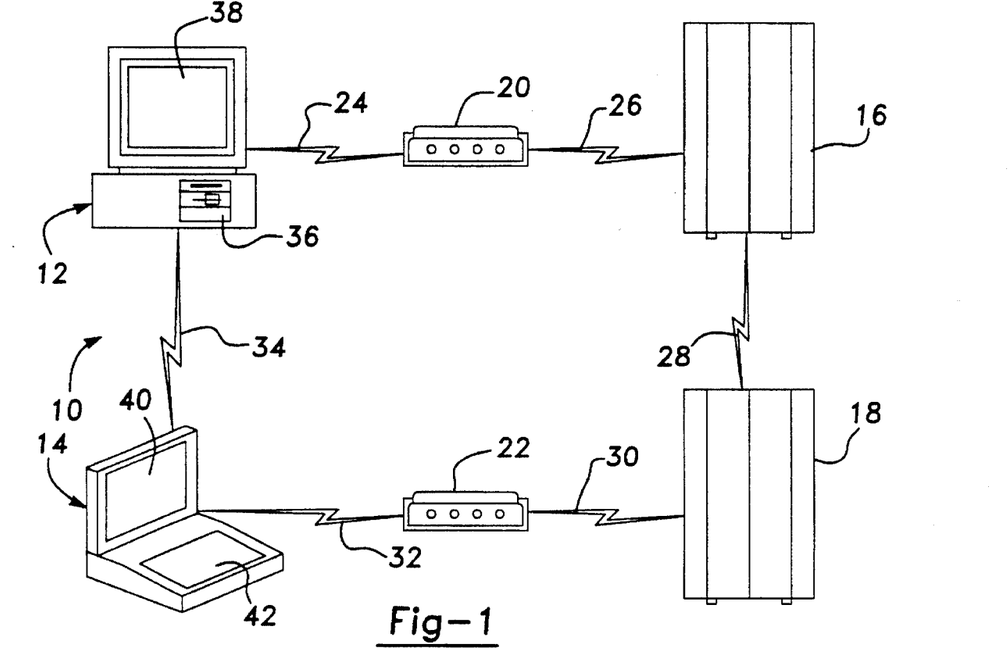
FIG. 1 is a diagrammatic representation of the auto-detect data communication system according to the present invention.

Referring to FIG. 1, a diagrammatic representation of the auto-detect data communication system 10 according to the present invention is shown. In this regard, FIG. 1 illustrates two types of data communication between a transmitting computer 12 and a receiving computer 14. While computer 12 is labeled as the transmitting computer and computer 14 is labeled as the receiving computer, it should be understood that both of these computers will be transmitting and receiving data during a communication session. Thus, the transmitting label attached to computer 12 is used to signify the computer which is sending a data stream which the receiving computer 14 needs to be able to interpret in real time. While the present invention is described in connection with the use of a serial data stream, it should be appreciated that the present invention may be used with other forms of data streams, such as parallel data streams. The present invention is further described in connection with an asynchronous form of data transmission, it should also be understood that the present invention may be adapted for use with synchronous forms of data transmission.

The first type of data communication illustrated in FIG. 1 is one in which a conventional telephone system is used as the data transmission carrier or facility. In this case, the telephone system is represented by one or more public switching stations, such as switching stations 16 and 18. Additionally, each of the computers 12–14 will generally require its own communication interface device for converting the binary-based signals used by a computer to the type of signal needed for transmission on a telephone network, such as an analog-based signal. Accordingly, FIG. 1 shows the use of a modem (modulator/demodulator) by each of the computers 12–14 as the communication interface device. In this regard, the modem 20 provides the interface between the transmitting computer 12 and the switching station 16, while the modem 22 provides the interface between the receiving computer 14 and the switching station 18. However, it should be appreciated that the present invention is not dependent upon the type or model of interface, and that other suitable communication interface devices may be employed, such as an Integrated Services Digital Network (ISDN) terminal adapter. Similarly, it should be appreciated that the present invention is not dependent upon the particular transmission medium being employed for the communication session. Accordingly, the medium of communication is generically illustrated in FIG. 1, between the various devices, such as the communication line 26 between the modem 20 and the switching station 16. These communication lines 24–32 may be used to represent any suitable communication medium, such as copper wire, fiber-optic cable, radio waves and so forth.

FIG. 1 also shows a second form of data communication, namely data communication which is more directly between the transmitting computer 12 and the receiving computer 14. In this case, the computers 12–14 could be connected together over a local area network or to each other's serial communication ports. To illustrate these types of connections, FIG. 1 includes a communication line 34 between the transmitting computer 12 and the receiving computer 14. However, in a multiple-CPU or multiple-threaded processing environment, it should be understood that the transmitting computer 12 and the receiving computer 14 could also be part of the same physical computer entity.

In any event, the transmitting computer 12 and the receiving computer 14 should include the hardware components which are typically included in commercially available computer systems or work stations. For example, the computers 12–14 should both be equipped with a mother board having a CPU (Central Processing Unit) and sufficient randomly accessible memory (e.g., RAM or Flash memory) to run the computer programs needed by the computer, a storage device (e.g., hard disk drive 36), a monitor or flat panel display (e.g., monitor 38 and display panel 40), and a keyboard or other input device (e.g., keyboard 42). Again, however, it should be understood that the present invention is not limited to any specific set of computer hardware components, and that the present invention may be used with a variety of computer entities which are otherwise capable of transmitting and receiving data signals between other computer entities. For example, the present invention could be integrated into the operation of a modem, as opposed to employing the processing capability of the computers 12–14. In other words, the modems 20–22 could be constructed to perform the auto-detect methods according to the present invention. The modems could then either identify the proper communication settings for their respective computers or perform the necessary signal conversions so that the modems always use a predetermined pattern of communication settings with their respective computers. On the other hand, the functionality provided by the modems 20–22 could also be integrated into their respective computers as well.

Figure 2:
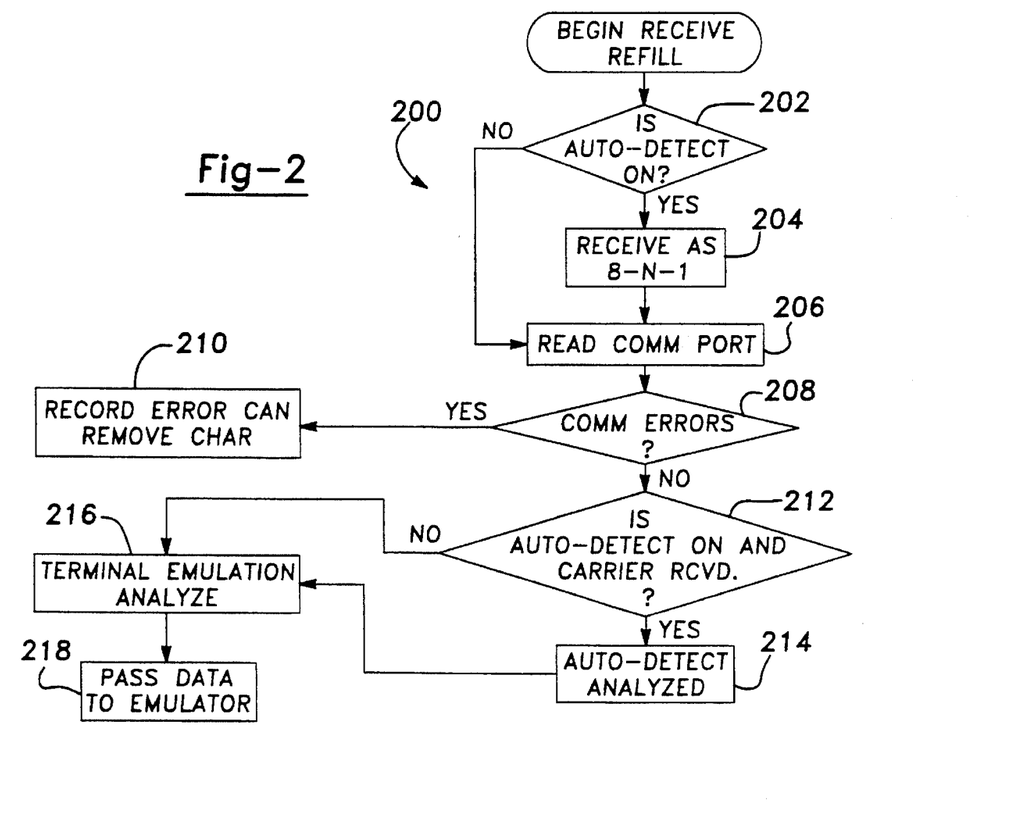
FIG. 2 is an overall flow chart of the auto-detect communication method according to the present invention.

Referring to FIG. 2, an overall flow chart of the auto-detect communication method according to the present invention is shown. In this regard, it should be pointed out that this method may form part of a comprehensive high-performance communication program, such as HyperACCESS® for Windows or HyperACCESS®/5 (for DOS or IBM OS/2®). Each of these exemplary communication software products are commercially available from the Hilgraeve, Inc., Monroe Mich. While the present invention may be implemented in part through software, it should be understood that a hardware only implementation may also be provided in the appropriate application. For example, a set of interconnected logic gates could be provided to filter desired information from the data stream being received, and counters provided to increment or otherwise record the results of the filtering action. An additional set of logic gates or a set of comparators could then be employed to make the communication setting determinations after a sufficient number of signals from the data stream have been tested to produce a reliable determination, as will be more fully described below.

FIG. 2 shows that the auto-detect communication method may advantageously form part of a Receive Refill routine 200, which is in turn part of a larger communication program. The Receive Refill routine is called when the buffer used to receive data is empty in order to refill it. This routine assumes that data is being received and it needs to be processed. In other words, for example, a communication session has been initiated between computers 12–14, and the receiving computer 14 must now interpret the information being conveyed in the data stream sent by the transmitting computer 12. This communication session could be initiated by the receiving computer 14, once the user has entered the telephone number (or interface address) into the communication program responsible for handling this communication session. In order to minimize the interaction of the user with the initial setup procedure for the communication session, the communication program could be programmed to use the baud rate negotiated by the modem 22 and always turn on the Auto-Detect feature as hereinafter described in detail.

The first step in the Receive Refill routine 200 is to check if the Auto-Detect feature is currently turned on or otherwise enabled (diamond 202). If the answer is Yes, then the communication port of the receiving computer 14 will employ a predetermined word format, which preferably is a word format which does not lose any data if it is incorrect (block 204). In this regard, the currently preferred word format is "8n1", which stands for eight bits per character, no parity, and one stop bit. In other words, the communication port will be configured to interpret the initial data received in a way which provides the highest probability of being correct. In this regard, it should be understood that there is no parity bit in this word format which could be stripped off as not being part of the data sequence. In the event that the answer to diamond 202 is No, then the Receive Refill routine 202 will proceed directly to reading the communication port (block 206). In this case, the computer 14 will employ the communication settings which have either been set manually by the user or set automatically as a result of the present invention.

Next, the Receive Refill routine will check for the presence of communication errors (diamond 208). In one form of the present invention, the Read Comm block 206 is a function which will return a value based upon whether or not the reading procedure was successful. If hardware or software problems outside of the scope of this invention prevent one or more characters from being read accurately from the data stream, then the Receive Refill routine will respond by recording the error and removing the data word character from further processing (block 210). In one form of the present invention, the various routines of the auto-detect communication method could be constructed in the "C" programming language and compiled for the Microsoft Windows environment. In such a case, certain functions available in the Microsoft Windows API may be employed, such as "ReadComm" for reading a pre-specified number of characters from a prespecified communication port and copying these characters into a pre-specified buffer, and "GetCommError" for specifying the error code returned from the ReadCorem function. However, it should be appreciated that other suitable functions and operating environments could be utilized in the appropriate application.

Assuming that no communication errors were encountered, then the Receive Refill routine will check to see if the Auto-Detect feature is still turned on and the carrier is connected (diamond 212). If the answer is Yes, then the Receive Refill routine will call the Auto-Detect Analyze routine 214 in accordance with the present invention. If the answer is No, then the Receive Refill routine will proceed to the Terminal Emulation Analyze routine 216. The Auto-Detect Analyze routine 214 is designed to detect the type of data word format being used by the transmitting computer 12 for character coding, and configure the communication port to this format. Similarly, the Terminal Emulation Analyze routine 216 is designed to detect the type of terminal that the transmitting computer 12 is emulating, and to lock in the receiving computer 14 to this type of terminal emulation. Once both the data word format and terminal emulation settings have been configured, then the data read from the communication port is passed on to the emulator portion of the communication program for further processing (block 218). For example, the emulator software will be responsible for responding to the terminal control codes received from the transmitting computer 12. While this terminal emulation responsibility may be as simple as sending properly interpreted characters to the display panel 40, there are a variety of control codes which do not necessarily effect or change what the user sees on the display panel 40.

In order to have a better appreciation for how the present invention detects the type of word format being used by the transmitting computer 12, the three most commonly used word formats used for asynchronous serial data communication will be discussed first. These word formats are referred to herein as "8n1", "7o1" and "7e1". As discussed above, "8n1" stands for eight bits per character, no parity and one stop bit. Similarly, "7o1" stands for seven bits per character, odd parity and one stop bit. Finally, "7e1" stands for seven bits per character, even parity and one stop bit. From this brief description, it should be apparent that all three of these word formats have one stop bit as a common setting. However, it should also be noted that all three of these formats also employ a total of ten bits per data word. These three formats are illustrated in Table 1 below using the example of a simple transmission of the English word "Hello" to the receiving computer. Accordingly, Table 1 shows the coding used for each of the letters in the word "Hello", as well as the coding for the "Enter" key on the keyboard of the transmitting computer 12. Each of these codes are based upon the American Standard Code for Information Interchange ("ASCII"), which is commonly used to store text. Letters, numbers, and special characters ($, #, % and so forth) are represented by different sequences of binary 1's and 0's which consist of seven data bits per character. While the use of seven bits per character permits a total of 128 different characters, there is an extended ASCII character set which is used for graphics and other special characters. The extended ASCII character set is based upon eight bits per character, and it enables another 128 different characters to be represented in code for a total of 256 possible characters. The 8n1 word format is based upon the extended ASCII character set, while the other two word formats are based upon the seven bits per character ASCII character set.

In light of the fact that an asynchronous transmission protocol is used with the 8n1, 7o1 and 7e1 word formats, the word format itself must contain the information necessary to apprise another computer entity as to where the code begins and ends. Accordingly, each of these three word formats include a start bit and a stop bit. By convention, the start bit is always a binary 0 and the stop bit is always a binary 1. In the 8n1 example, the word format consists of the start bit, the extended ASCII code and the stop bit, as shown in Table 1. In contrast, the other two word formats include the provision of a "parity" bit which is interposed between the stop bit and the most significant bit of the seven bit per character ASCII code. The parity bit is added by the transmitting computer 12 as a standard technique enabling transmission errors to be detected at the receiving computer 14. The added parity bit makes the sum of binary one bits in the data word either an odd number (for odd parity) or an even number (for even parity), without including the start or stop bits.

While the present invention is described in connection with examples of using word formats having ten bits per data word, it should be appreciated that the present invention could be suitably modified to detect communication settings which employ a greater or lesser number of bits per character. Similarly, the present invention is not limited to the use of ASCII coding in order to perform its detection functions, and other suitable coding techniques could be used in the appropriate application.

In a serial transmission scheme, the data words are transmitted sequentially, as illustrated in Table 2. Table 2 illustrates how each of the data words would be transmitted under each of the word formats described above. In this regard, it should be pointed out that there are not necessarily spaces or pauses between data words when they are being transmitted.

TABLE 2

| Example of Alternate Serial Transmission Parameters | | | | | | |
|---|---|---|---|---|---|---|
| Enter | o | l | l | e | H | |
| 1000011010 | 1111011110 | 1111011000 | 1111011000 | 1111001010 | 1110010000 | 7o1 |
| 1100011010 | 1011011110 | 1011011000 | 1011011000 | 1011001010 | 1010010000 | 7e1 |
| 1000011010 | 1011011110 | 1011011000 | 1011011000 | 1011001010 | 1010010000 | 8n1 |

From an examination of Table 2, it should be appreciated that there can be many instances when the data words are identical even though two different word formats are being employed. For example, the data words for the English word "Hello" are the same for both the 7e1 and 8n1 word formats. Accordingly, if the data words for "Hello" were transmitted, the receiving computer 14 would have a rather difficult time discerning which data word format was being used. Similarly, the data word for the "Enter" key is the same for both the 7o1 and 8n1 word formats. In light of the fact that the

TABLE 1

| | | | 7o1 Setting Example | | | | | | | |
|---|---|---|---|---|---|---|---|---|---|---|
| Character | Stop Bit | Odd Parity Bit | Most Sign Bit | 6th Bit | 5th Bit | 4th Bit | 3rd Bit | 2nd Bit | Least Sign. Bit | Start Bit |
| H | 1 | 1 | 1 | 0 | 0 | 1 | 0 | 0 | 0 | 0 |
| e | 1 | 1 | 1 | 1 | 0 | 0 | 1 | 0 | 1 | 0 |
| l | 1 | 1 | 1 | 1 | 0 | 1 | 1 | 0 | 0 | 0 |
| l | 1 | 1 | 1 | 1 | 0 | 1 | 1 | 0 | 0 | 0 |
| o | 1 | 1 | 1 | 1 | 0 | 1 | 1 | 1 | 1 | 0 |
| Enter | 1 | 0 | 0 | 0 | 0 | 1 | 1 | 0 | 1 | 0 |

| | | | 7e1 Setting Example | | | | | | | |
|---|---|---|---|---|---|---|---|---|---|---|
| Character | Stop Bit | Even Parity Bit | Most Sign Bit | 6th Bit | 5th Bit | 4th Bit | 3rd Bit | 2nd Bit | Least Sign. Bit | Start Bit |
| H | 1 | 0 | 1 | 0 | 0 | 1 | 0 | 0 | 0 | 0 |
| e | 1 | 0 | 1 | 1 | 0 | 0 | 1 | 0 | 1 | 0 |
| l | 1 | 0 | 1 | 1 | 0 | 1 | 1 | 0 | 0 | 0 |
| l | 1 | 0 | 1 | 1 | 0 | 1 | 1 | 0 | 0 | 0 |
| o | 1 | 0 | 1 | 1 | 0 | 1 | 1 | 1 | 1 | 0 |
| Enter | 1 | 1 | 0 | 0 | 0 | 1 | 1 | 0 | 1 | 0 |

| | | | 8n1 Setting Example | | | | | | | |
|---|---|---|---|---|---|---|---|---|---|---|
| Character | Stop Bit | Most Sign Bit | 7th Bit | 6th Bit | 5th Bit | 4th Bit | 3rd Bit | 2nd Bit | Least Sign. Bit | Start Bit |
| H | 1 | 0 | 1 | 0 | 0 | 1 | 0 | 0 | 0 | 0 |
| e | 1 | 0 | 1 | 1 | 0 | 0 | 1 | 0 | 1 | 0 |
| l | 1 | 0 | 1 | 1 | 0 | 1 | 1 | 0 | 0 | 0 |
| l | 1 | 0 | 1 | 1 | 0 | 1 | 1 | 0 | 0 | 0 |
| o | 1 | 0 | 1 | 1 | 0 | 1 | 1 | 1 | 1 | 0 |
| Enter | 1 | 0 | 0 | 0 | 0 | 1 | 1 | 0 | 1 | 0 | communication program in the receiving computer 14 may not have any advance information as to which characters will be transmitted first from the transmitting computer 12, the need exists for the auto-detect communication method according to the present invention in order to reliably detect the data word format being used as quickly as possible, so that the information being transmitted is properly interpreted at the receiving computer 14.

Figure 3A:
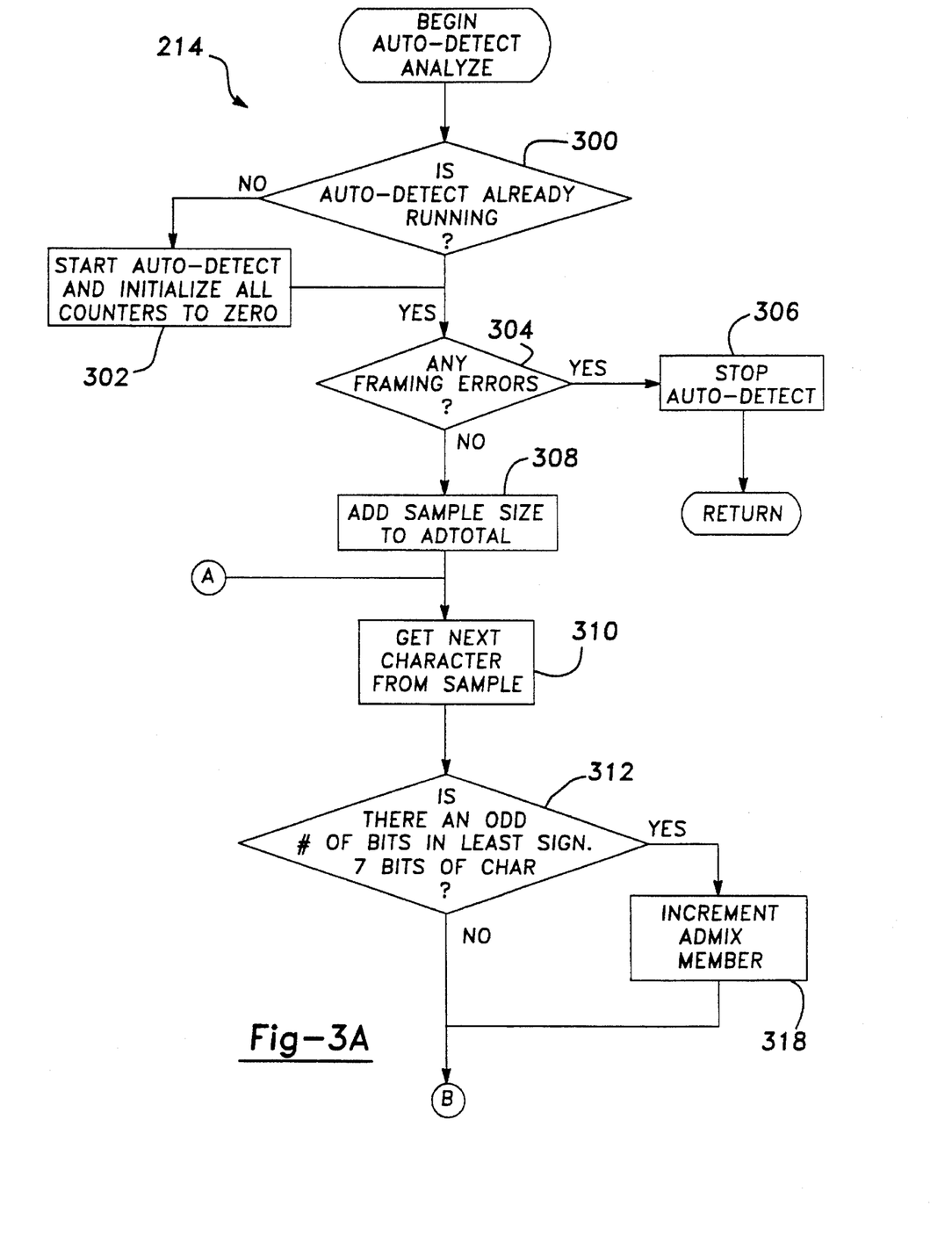
FIGS. 3A–3E represent a set of flow chart diagrams which illustrate the Auto-Detect Analyze method depicted in FIG. 2 and an Auto-Detect Output method in connection therewith.

Referring to FIGS. 3A–3D, a set of flow chart diagrams which illustrate the AutoDetect Analyze method according to the present invention is shown. The initial step in this method is a check to see if the Auto-Detect feature is already running (diamond 300). If this is the first time that the Auto-Detect Analyze method 214 has been called for the current communication session, then the Auto-Detect engine will be initialized (block 302). This initialization resets a predetermined data structure to an initial condition. This data structure includes a set of counters (which are initialized to zero), and a set of flag values, as follows:

| | |
|---|---|
| ADTotal | for the total number of data words processed |
| ADMix | for the number of data words having odd parity using the least significant seven bits |
| AD7o1 | for the number of data words having odd parity using all eight bits of the data word |
| ADHighBits | for the number of data words having the high bit set |
| FramingErrors | for the number of framing errors encountered |
| ADRunning | a flag indicative of whether the Auto-Detect method is currently enabled |
| ADLastChar | a flag indicative of whether the same character is being transmitted again |
| ADToggleParity | a flag indicative of which way to toggle the parity bit |
| ADReconfigure | a flag indicative of there being enough data to make a word format determination |
| ADBestGuess | a value indicative of which word format has been selected on an interim basis for output transmissions |

Once the Auto-Detect Analyze method 214 has been initialized, a check will be made for the presence of any framing errors (diamond 304). A flaming error in this context represents a failure to detect the stop bit. Accordingly, the existence of flaming errors may indicate that the wrong baud rate has been set or that an unusual communication setting has been encountered. In any event, it would not be effective to continue the Auto-Detect Analyze method 214 until the flaming error condition is corrected. Accordingly, the Auto-Detect Analyze method 214 will be stopped (blocked 306). While a visual indication of the problem could be sent to the user's display screen, an effort to automatically correct the problem and resume the Auto-Detect Analyze method 214 could also be developed.

Assuming that there are no framing errors, then the sample size will be added to the ADTotal value in the data structure (block 308). This sample size will be the total number of data words read from the communication port in block 206 of FIG. 2. In this regard, it should be appreciated that if the Auto-Detect Analyze method 214 is still running the next time that the Receive Refill routine 200 is called, then the ADTotal value will represent that total number of data words from any and all of the previous instances in the current communication session that the AutoDetect Analyze method 214 has been run, including the present instance.

Figure 3B:
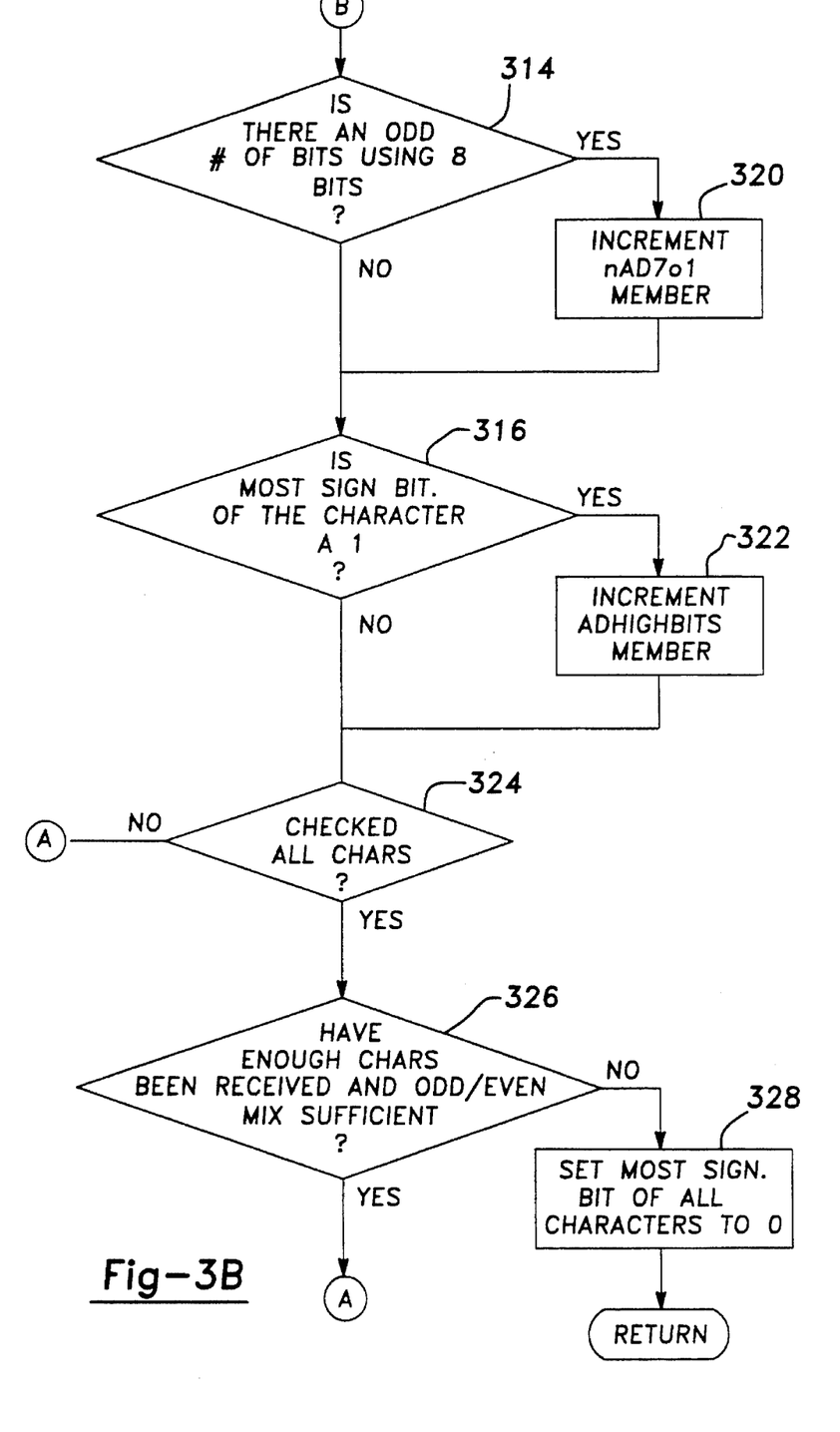

The next data word, will then be obtained from the buffer in memory where the received data words are temporarily being stored (block 310). In the first instance, block 310 will be used to obtain the first data word which has been read from the communication port of the receiving computer 14. A series of three tests will then be performed on the present data word (or character) being processed, as represented by diamonds 312–316. The first test is to see if there is an odd number of bits in the least significant seven bits of the character (diamond 312). If the answer is Yes, then the ADMix member of the data structure will be incremented by one (block 318). The second test is to see if there is an odd number of bits using all eight bits of the character (diamond 314). If the answer is Yes, then the AD7o1 member of the data structure will be incremented by one (block 320). The third test is to see if the most significant bit of the character is a binary 1 (diamond 316). If the answer is Yes, then the ADHighBits member of the data structure will be incremented by one (block 322).

Once these three tests have been conducted, then a check will be made to see if all of the data words read from the communication port have been processed (diamond 324). Assuming that the answer is No, then the Auto-Detect Analyze method 214 will return to block 310 in order to obtain the next data word. The results of these three tests on the example of using the English word "Hello" followed by the "Enter" key are shown in Tables 3A–3C for each of the identified word formats. For example, in the case of the 7o1 word format, the answer to the first test is No for each letter in the English word "Hello", and Yes for the "Enter" key. Accordingly, the value of ADMix is 0 until the "Enter" key is processed, in which case ADMix contains the value of 1. In contrast, the answer to the second test is Yes for letter in the English word "Hello", as well as for the "Enter" key. Accordingly, the value of AD7o1 increments by 1 as each of these data words are processed.

TABLE 3A

"7o1" Example

| Enter | o | l | l | e | H | |
|---|---|---|---|---|---|---|
| 1 - yes | 0 - no | 0 - no | 0 - no | 0 - no | 0 - no | Mix |
| 6 - yes | 5 - yes | 4 - yes | 3 - yes | 2 - yes | 1 - yes | 7o1 |
| 5 - no | 5 - yes | 4 - yes | 3 - yes | 2 - yes | 1 - yes | HB |

TABLE 3B

"7e1" Example

| Enter | o | l | l | e | H | |
|---|---|---|---|---|---|---|
| 1 - yes | 0 - no | 0 - no | 0 - no | 0 - no | 0 - no | mix |
| 0 - no | 0 - no | 0 - no | 0 - no | 0 - no | 0 - no | 7o1 |
| 1 - yes | 0 - no | 0 - no | 0 - no | 0 - no | 0 - no | HB |

TABLE 3C

"8n1" Example

| Enter | o | l | l | e | H | |
|---|---|---|---|---|---|---|
| 1 - yes | 0 - no | 0 - no | 0 - no | 0 - no | 0 - no | Mix |
| 1 - yes | 0 - no | 0 - no | 0 - no | 0 - no | 0 - no | 7o1 |
| 0 - no | 0 - no | 0 - no | 0 - no | 0 - no | 0 - no | HB |

The next step in the Auto-Detect Analyze method 214 is to determine if enough data words have been received and the mix between even/odd numbers of bits is such that the type of data word format being used may be reliably detected (diamond 326). In this regard, it should be appreciated from the discussion of Table 2 that many data words may qualify as legitimate data words under more than one format. Accordingly, a sufficient number of data words need to be processed in order to achieve a high probability of successfully detecting the data word format being used. However, the mere number of data words processed is in and of itself not a reliable indicator, because, a string of data words could conceivably all have the same potential parity. Accordingly, a mix of even and odd parity candidates is needed in order to be sure that an accurate determination can be made without operator interaction. In one form of the present invention, the number of data words processed is preferably on the order of 15 to 20, and the mix between odd/even parity candidates is preferably on the order of 8. While diamond 326 is shown to follow diamond 324 in FIG. 3B, it should be appreciated that the order could readily be reversed depending upon the number of data words already processed. Similarly, the order of the tests described above could readily be changed, and further tests could be added in order to handle other possible data word types. In the event that the answer to diamond 326 is No, then the most significant bit of all of the data words will be set to zero in order to turn any graphic characters into text to minimize potential confusion to the user (block 328).

Figure 3C:
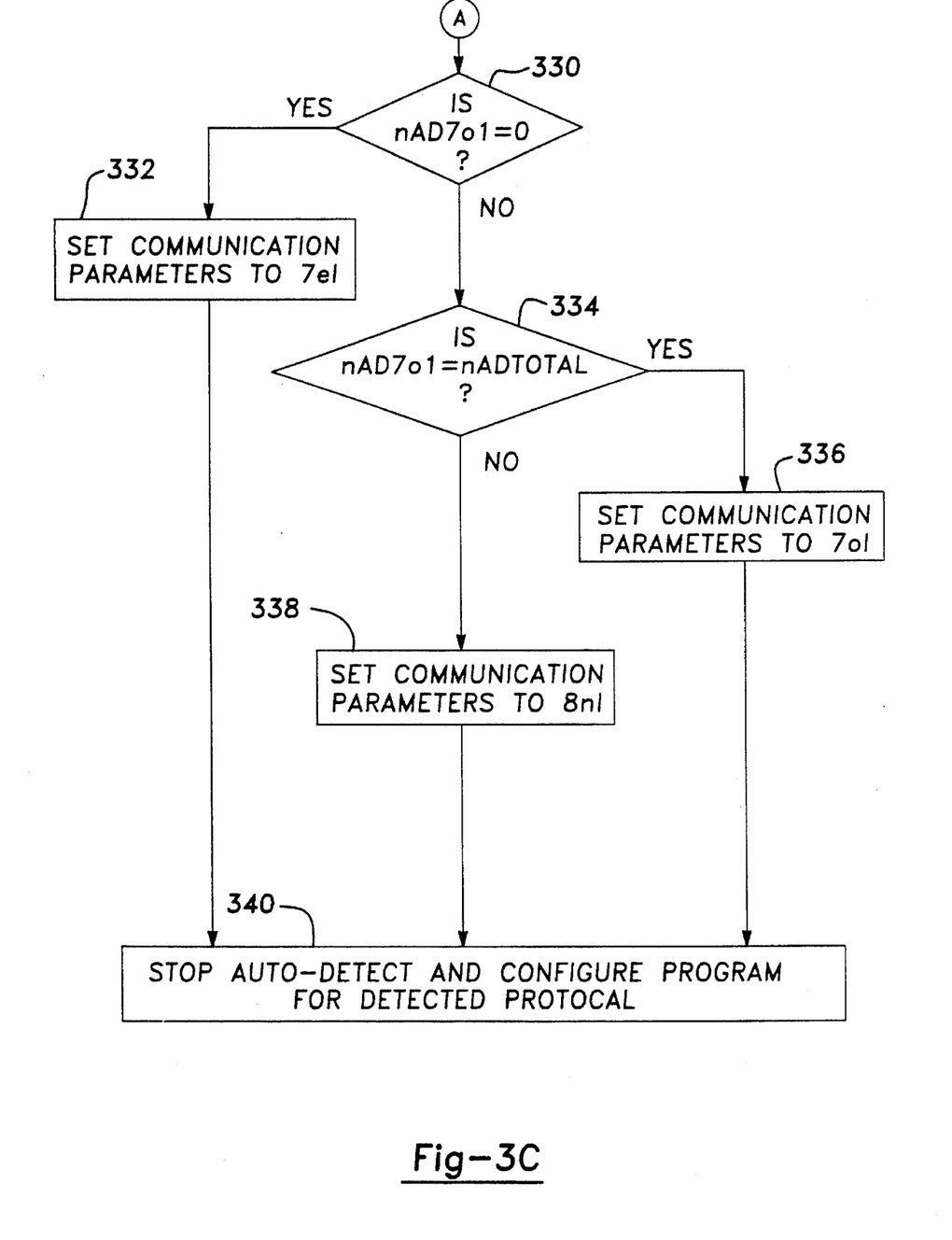

Once both conditions of diamond 326 have been satisfied, then the Auto-Detect Analyze method 214 will proceed to determining the data word format used by the transmitting computer 12. Using the three data word formats discussed above as an example, the data word format may be determined from an analysis of just the AD7o1 and ADTotal member values. Specifically, if the value of AD7o1 is equal to zero (diamond 330), then this means that the 7e1 format is most probably being used, and the communication parameters will be set to 7e1 (block 332). Similarly, if the value of AD7o1 is equal to ADTotal (diamond 334), then this means that the 7o1 format is most probably being used, and the communication parameters will be set to 7o1 (block 334). If the answer to both of the diamonds 330 and 334 is No, then this means that neither the 7o1 or 7e1 word formats are being used. Accordingly, for purposes of this example, the communication parameters will be set to 8n1 (block 338). However, a check could also be made to see if the ADHighBits value was equal to ADTotal. In such a case, it is possible that the data word format could be a less frequently used format, such as 7mark1, and additional tests may be required to include less frequently encountered data word formats. Finally, the Auto-Detect Analyze method 214 will be stopped, and the communication port will be configured for the detected data word type (block 340). This particular data word type will also be stored as part of the configuration for this computer telephone number or address, so that subsequent communication sessions will not need to invoke the Auto-Detect Analyze method 214.

Figure 3D:
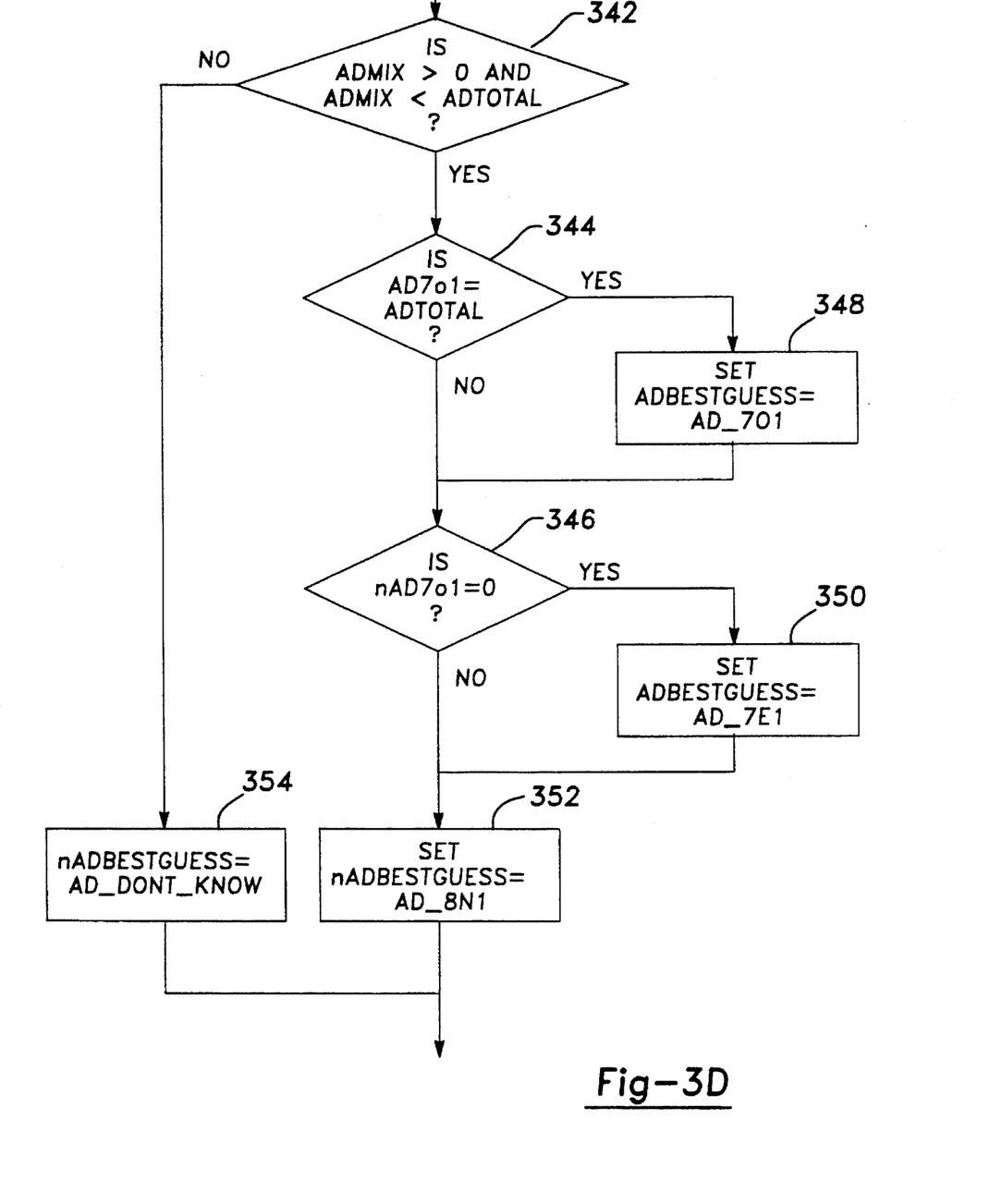

Referring to FIG. 3D, an additional portion to the Auto-Detect Analyze method 214 is shown. In this regard, this additional portion is directed to making an interim "best guess" determination of the word format until sufficient data has been received to make a final determination, as shown in FIG. 3C. The flow chart of FIG. 3D may be inserted into the flow chart of FIG. 3B between diamonds 324 and 326 when an interim word format decision would be beneficial. For example, an interim word format decision would be beneficial if a message needs to be sent from the receiving computer 14 to the transmitting computer 12 before a final determination has been made, as will be described in connection with FIG. 3E. The key to being able to make an interim decision occurs when at least two data words have been received with different potential parity settings. This is illustrated by diamond 342 which determines if ADMix is greater than zero, and less than ADTotal. Under these conditions, at least one data word has been received with the potential for even parity and at least one data word has been received with the potential for odd parity.

As soon as there are candidate characters for both even and odd parity, a tentative word format decision is immediately possible. This decision making process is illustrated by diamonds 344 and 346. Specifically, diamond 344 checks to see if the number of data words received with odd parity potential is equal to the total number of data words received, then means that the 7o1 format is most probably being used. Accordingly, the ADBestGuess value in the data structure will be set to AD_7o1, which is an integer value representing the 7o1 word format (block 348). Similarly, diamond 346 checks to see if the number of data words received with odd parity potential is equal to zero, then means that the 7e1 format is most probably being used. Accordingly, the ADBestGuess value in the data structure will be set to AD_7E1, which is an integer value representing the 7e1 word format (block 350). In the event that the answers to both diamonds 344–346 are NO, then the ADBestGuess value in the data structure will be set to AD_8N1, which is an integer value representing the 8n1 word format (block 352). Prior to the time that blocks 348–352 are employed to set the value for ADBestGuess, the value for ADBestGuess is set to AD_DONT_KNOW, which is a neutral default value. This possible value for ADBestGuess is represented by block 354.

From the above, it should be appreciated that the 7e1 word format may be ruled out by any character with an odd number of binary one bits. Similarly, the 7o1 word format may be ruled out by any character with an even number of binary one bits. In contrast, the 8n1 word format is not ruled out until a final determination can be made. As soon as the first data word is received, it is possible to rule out either the 7o1 or 7e1 word formats. As long as the data has not proved to be the 8hi word format, it is ambiguously the 8n1 word format or one of the 7-bit combinations. However, it is possible to eliminate both of the 7-bit combinations in as few as two data words. For example, with a carriage return character CR and a line feed character LF, it is possible to determine if either of the 7-bit combinations are being used. This is because each of these two characters effectively rules out one of the three choices, leaving only the 8n1 word format. Using the CR-LF example, it may be assumed that the following two data words are received as hex codes 0×0D and 0×0A. The 0×0D is legal as an 8n1 character or as a 7o1 character, but not a 7e1 character. Similarly, the 0×0A is legal as an 8n1 character or as a 7e1 character, but not a 7o1 character.

Figure 3E:
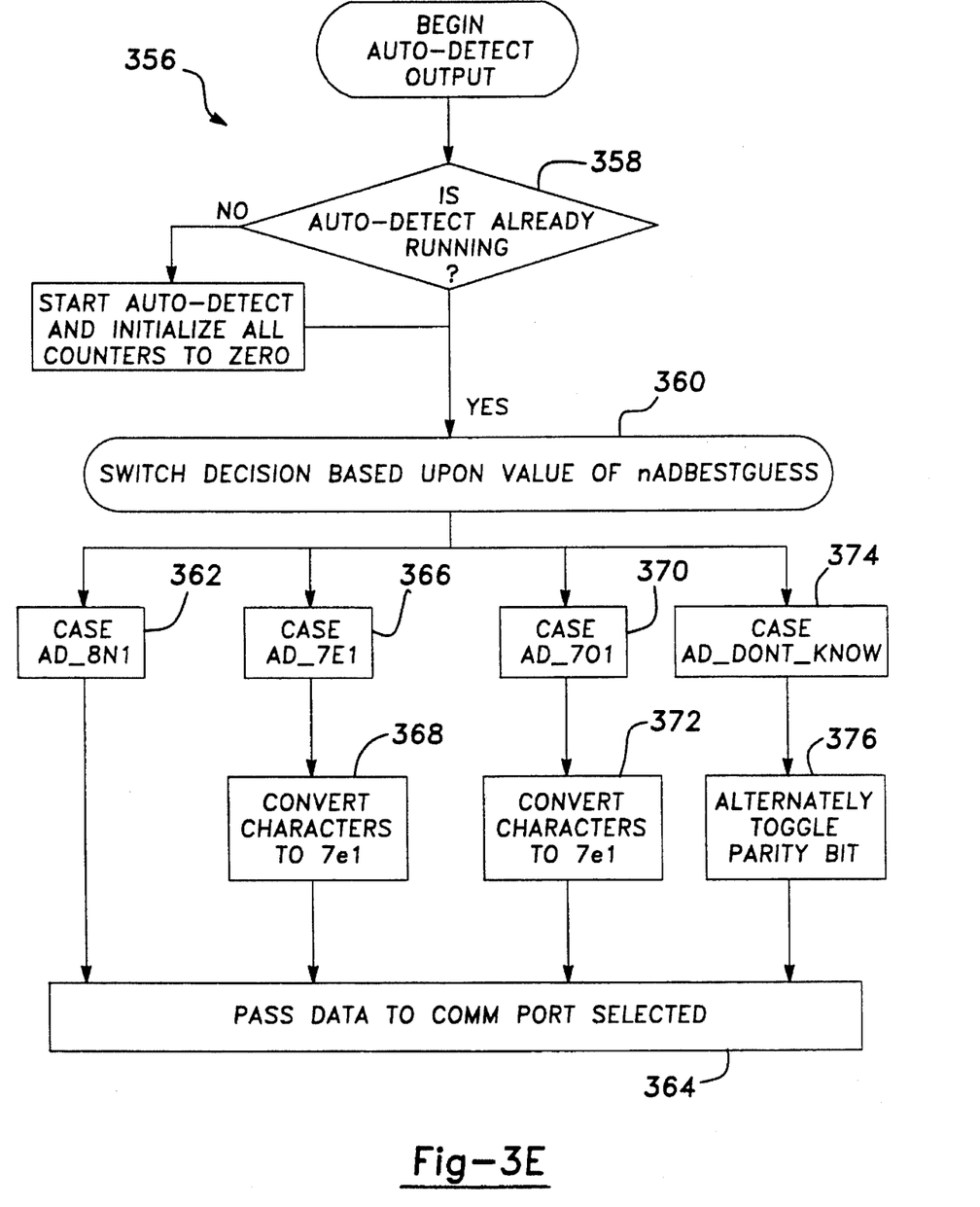

Turning now to FIG. 3E, a flow chart is shown which illustrates the Auto-Detect Output method 356 according to the present invention. This method takes advantage of the interim determination made in FIG. 3D to send data to the transmitting computer 12. As in the case of the Auto-Detect Analzye method 214, the Auto-Detect Output method 356 begins with a check to see if the Auto-Detect method is already running (diamond 358). Assuming that the answer is YES, then a decision will be made as to which word format should be used to send data to the transmitting computer 12 based upon the value of the ADBestGuess value (decision block 360). As illustrated in FIG. 3E, a switch/case statement combination is preferably employed. However, it should be understood that other suitable processing techniques also may be employed.

In the case that the ADBestGuess value has been set to AD_8N1 (block 362), then no action has to taken other than to pass the data to the communication port, as the data has already been treated as being in the 8n1 word format.

However, in the case that ADBestGuess value has been set to AD_7E1 (block 366), then the data words will be converted to the 7e1 format (block 368). Similarly, in the case that ADBestGuess value has been set to AD_7O1 (block 370), then the data words will be converted to the 7o1 format (block 372). In contrast, in the case that ADBestGuess value is still at its default value AD_DONT_KNOW (block 374), then the parity bit will be toggled every other time, as long as the same single character is being sent to the transmitting computer 12. This is done to give the best possible chance of responding to the transmitting computer 12 with data that it expects.

Figure 4:
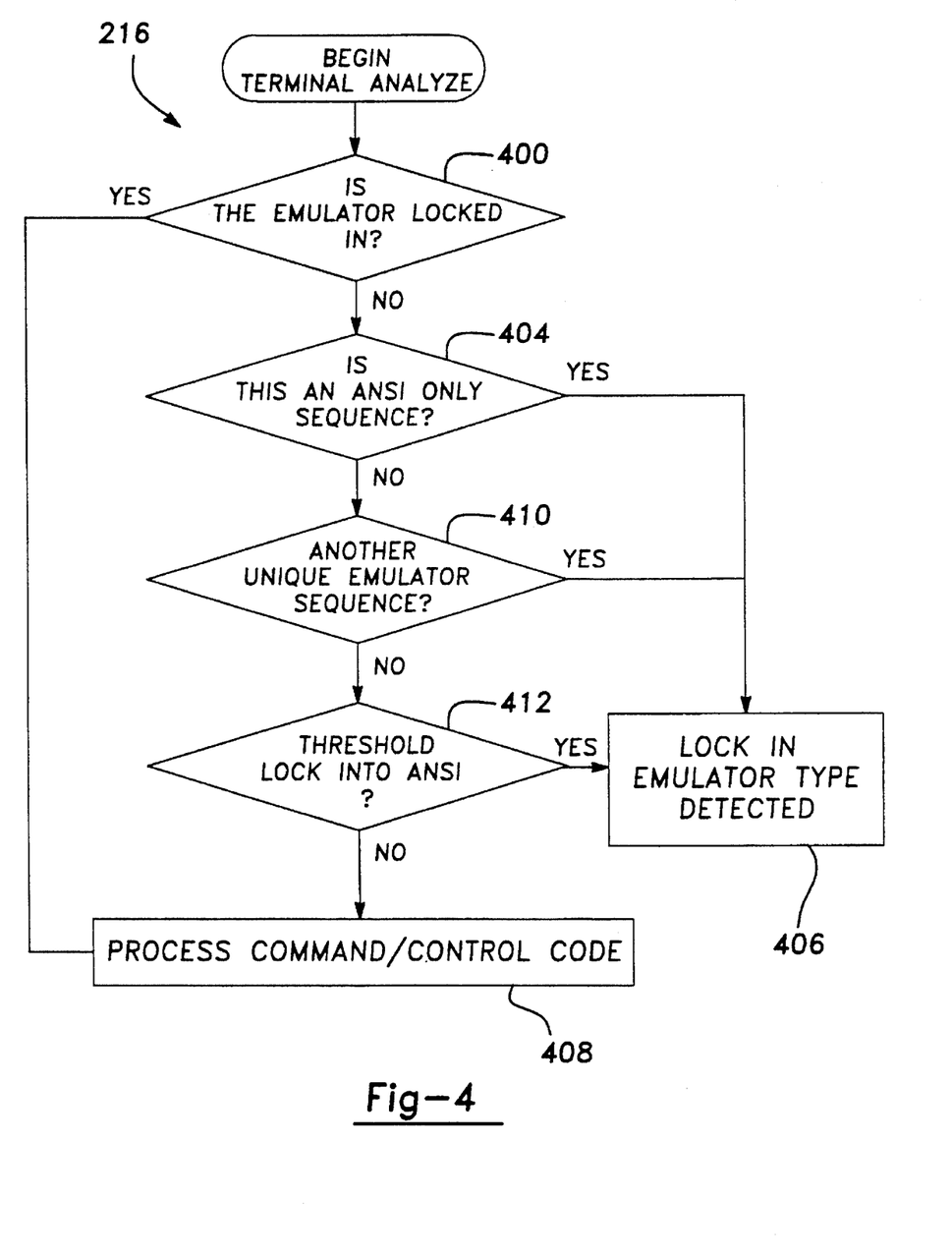
FIG. 4 is a block diagram which illustrates the Terminal Analyze method depicted in FIG. 2.

Referring to FIG. 4, a flow chart which illustrates the Terminal Analyze method 216 is shown. This method relies upon the use of a state machine to determine the type of terminal mode being used by the transmitting computer 12. In one form of the present invention, each terminal emulator is provided with its own state table. A small portion of the one of the tables employed in the state machine is set forth below:

```
// State 0
{0,  0x01,       0x01,        nothing}
{0,  TEST(' '),  0xFF,        std graphic}
{1,  ESC,        ESC,         nothing}
{0,  TEXT(' '),  TEXT(' '),   tabn}
{0,  TEXT('[r]'),TEXT('[r]'), carriage return}
// State 1
{2,  TEXT('['),  TEXT('['),   ANSI_Pn_Clr}
{0,  TEXT('D'),  TEXT('D'),   ANSI_IND}
{0,  TEXT('E'),  TEXT('E'),   ANSI_NEL}
{0,  TEXT('H'),  TEXT('H'),   ANSI_HTS}
{2,  TEXT('Y'),  TEXT('Y'),   emuAutoNothingVT52}
            // VT52 Terminal sequence detected
{3,  TEXT('8'),  TEXT('8'),   emnuAutoSaveCursorVT100}
            // VT100 Terminal sequence detected
// State 2
{0,  TEXT('p'),  TEXT('p'),   emuAutoNothingAnsi}
{0,  TEXT('s'),  TEXT('s'),   emuAutoSaveCurAnsi}
{0,  TEXT('q'),  TEXT('q'),   emuAutoNothingVT100}
{5,  TEXT(':'),  TEXT(':'),   ANSI_PN}
// State 3
{3,  0x00        0xFF,        emuStdChkZmdm}    -
// State 4
{4,  0x00,       0xFF,        nothing}
// State 5
{0,  TEXT('2'),  TEXT('2'),   emuAutoPnAnsi}
{0,  TEXT('5'),  TEXT('5'),   emuAutoPnAnsi}
{0,  TEXT('p'),  TEXT('p'),   emuAutoNothingVT100}
```

The first field in this state table indicates the next state in the table to examine. Accordingly, a "0" in this field means that the machine should stay in the lowest or 0 state, while a "3" in this field means that the machine should proceed to the third state. The next two fields in the table indicate the range of characters that may be matched in terms of their character or ASCII code value. The last field in the table identifies a function that should be called. For example, the field value "emuAutoNothingVT52" means that a VT52 terminal control sequence has been detected, and function being called will enable the VT52 emulation mode to be locked in and the control sequence to be executed. In contrast, the field value "ANSI_IND" means that a sequence has been detected which is common to both an ANSI terminal and one or more other types of terminal modes. However, the function being called will execute the sequence as though it were an ANSI terminal.

Turning now specifically to FIG. 4, the first step of the Terminal Emulation Analyze method 216 is a check to see if the emulator mode has already been locked in (diamond 400). If the answer is Yes, then the method will proceed immediately to processing the command, text or control code read from the communication port (block 402). Otherwise, the method will proceed into the state machine discussed above. In one form of the present invention, the state table is preferably constructed to check for an ANSI only sequence first (diamond 404). For example, many ANSI only sequences begin with the Escape key followed the left square bracket key, such as "ESC [3; 5 m" for setting the foreground and background colors of the display. If an ANSI only sequence is detected by traversing the state table discussed above, then the method will call the function which will lock in the emulation mode detected and execute the control sequence being processed (block 408). Otherwise, the method will continue traversing the state table in order to detect other unique emulation mode sequences (diamond 410). Lastly, if an emulation mode was not detected, a threshold evaluation will be done to check for the number of logins or times that the Terminal Emulation Analyze routine 214 was called (diamond 412). If the number of detecting attempts exceeds a predetermined value, then the most widely used terminal mode will be locked in as a default.

The present invention has been described in an illustrative manner. In this regard, it is evident that those skilled in the art once given the benefit of the foregoing disclosure, may now make modifications to the specific embodiments described herein without departing from the spirit of the present invention. Such modifications are to be considered within the scope of the present invention which is limited solely by the scope and spirit of the appended claims.

What is claimed is:

1. A method of automatically configuring the communication settings of a computer to interpret a data stream without requiring any advance knowledge of the word format used to transmit said data stream or the information contained in said data stream, comprising the steps of:

defining a first word format wherein a unit of information is represented by a plurality of bits, the most significant bit being a parity bit of a first polarity;

defining a second word format wherein a unit of information is represented by a plurality of bits, the most significant bit being a parity bit of a second polarity;.

defining a third word format wherein a unit of information is represented by a plurality of bits, the most significant bit having no parity bit significance;

receiving said data stream by said computer;

testing a series of multiple-bit sequences from said data stream against said first, second and third defined word formats until a predetermined number of said multiple-bit sequences have been received and tested and a predetermined mix of multiple-bit sequences satisfying at least two of said defined word formats have been received and tested;

determining a data word format setting from the results of said testing step; and configuring said computer to interpret said data stream in accordance with said data word format setting.

2. The invention according to claim 1, further including the step of testing characters interpreted from said data stream against a plurality of terminal emulation criteria until a character sequence has been detected which is indicative of only one terminal emulation standard.

3. A system for automatically configuring the communication settings of a computer to interpret a data stream without requiring any advance knowledge of the word format used to transmit said data stream or the information contained in said data stream, comprising:

interface means for receiving a data stream;

first processing means for defining a first word format wherein a unit of information is represented by a plurality of bits, the most significant bit being a parity bit of a first polarity, said first processing means also defining a second word format wherein a unit of information is represented by a plurality of bits, the most significant bit being a parity bit of a second polarity, said first processing means also defining a third word format wherein a unit of information is represented by a plurality of bits, the most significant bit having no parity bit significance;

second processing means for testing a series of multiple-bit sequences from said data stream against said first, second and third defined word formats until a predetermined number of said multiple-bit sequences have been received and tested and a predetermined mix of multiple-bit sequences satisfying at least two of said defined word formats have been received and tested;

third processing means for determining a data word format setting from the results of said second processing means; and storage means for configuring said computer to interpret said data stream in accordance with said data word format setting.

4. The invention according to claim 3, further including fourth processing means for testing characters interpreted from said data stream against a plurality of terminal emulation criteria until a character sequence has been detected which is indicative of only one terminal emulation standard.

5. The invention according to claim 4, wherein said fourth processing means includes a state machine which includes a plurality of levels for determining when a character sequence has been detected which is indicative of only one terminal emulation standard.

6. The invention according to claim 3, wherein said data stream is a serial data stream, which has been received from another computer.

7. The invention according to claim 6, wherein said interface means includes a modem and a buffer for temporarily holding said data stream until all of said testing has been completed.

8. A method of automatically configuring the communication settings of a computer to interpret a data stream without requiring any advance knowledge of the word format used to transmit said data stream or the information contained in said data stream, comprising the steps of:

receiving said data stream by said computer;

defining a first word format wherein a unit of information is represented by a plurality of bits, the most significant bit being a parity bit of a first polarity;

defining a second word format wherein a unit of information is represented by a plurality of bits, the most significant bit being a parity bit of a second polarity;

defining a third word format wherein a unit of information is represented by a plurality of bits, the most significant bit having no parity bit significance;

testing a series of multiple-bit sequences form said data stream against at least one of said first, second and third defined word formats;

determining at least an interim data word format setting from the results of said testing step after at least two multiple-bit sequences have been received which have potential for meeting two of said defined word formats; and causing said computer to transmit data streams in accordance with said interim data word format setting.

9. A method of automatically configuring the communication settings of a computer to emulate one of a plurality of computer terminal types without requiring any advance knowledge of the communication settings used to transmit data or the information contained in said data, comprising the steps of:

receiving a data stream by said computer;

interpreting the presence of characters from multiple-bit sequences in said data stream;

processing combinations of said interpreted characters through a state machine having a plurality of different table levels that progress toward the identification of a unique emulation mode;

causing said computer to execute combinations of said interpreted characters which satisfy one of a plurality of emulation modes that satisfy said combinations until a unique emulation mode has been determined;

determining a unique emulation mode from the results of said processing step; and causing said computer to lock in said determined emulation mode.

10. The invention according to claim 1, wherein step of determining a data word format setting from the results of said testing step includes:

(a) reading a unit from the data stream and testing a most significant bit against remaining bits to determine which of the first and second word formats is not satisfied by the unit and storing data recording that the word format was not satisfied by the unit;

(b) repeating step (a) for successive units until conditions exercising both first and second word formats have occurred and until a predetermined number of units has been read and tested;

(c) after conditions exercising both first and second word formats have occurred and after a predetermined number of units has been read and tested, determining the stream to be one of said word formats as follows;

(d) determining the data stream to be of the third word format if said first and second word formats were recorded as not satisfied in step (a);

(e) determining the data stream to be of the first word format if only said second word format was recorded as not satisfied in step (a);

(f) determining the stream to be of the second word format if only said first word format was recorded as not satisfied in step (a).

11. The invention according to claim 3, wherein said third processing means determines a data word format setting from the results of said testing step by:

(a) reading a unit from the data stream and testing a most significant bit against remaining bits to determine which of the first and second word formats is not satisfied by the unit and storing data recording that the word format was not satisfied by the unit;

(b) repeating step (a) for successive units until conditions exercising both first and second word formats have occurred and until a predetermined number of units has been read and tested;

(c) after conditions exercising both first and second word formats have occurred and after a predetermined number of units has been read and tested, determining the stream to be one of said word formats as follows;

(d) determining the data stream to be of the third word format if said first and second word formats were recorded as not satisfied in step (a);

(e) determining the data stream to be of the first word format if only said second word format was recorded as not satisfied in step (a);

(f) determining the stream to be of the second word format if only said first word format was recorded as not satisfied in step (a).

* * * * *